United States Patent [19]

Vauclin

[11] Patent Number: 5,510,720
[45] Date of Patent: Apr. 23, 1996

[54] DEVICE FOR DETECTING ATTEMPTS AT FRAUD ON AN APPARATUS FOR READING AND WRITING ON A CHIP CARD

[75] Inventor: Philippe Vauclin, Viuz en Sallaz, France

[73] Assignee: Landis & Gyr Business Support AG, Zug, Switzerland

[21] Appl. No.: 331,791

[22] Filed: Oct. 27, 1994

Related U.S. Application Data

[60] Division of Ser. No. 9,874, Jan. 27, 1993, Pat. No. 5,412,318, which is a continuation-in-part of Ser. No. 967,620, Oct. 28, 1992, abandoned.

[30] Foreign Application Priority Data

Mar. 17, 1992 [CH] Switzerland ............................ 00854/92
May 25, 1992 [CH] Switzerland ........................ 01 679/921
Nov. 16, 1992 [CH] Switzerland ........................ 03 519/92

[51] Int. Cl.⁶ .................................................. G01R 27/26
[52] U.S. Cl. ......................... 324/652; 324/655; 324/682; 324/683; 235/441; 235/492; 340/653
[58] Field of Search ...................................... 324/652, 655, 324/681, 682, 683; 235/441, 492, 488, 380; 340/653, 540

[56] References Cited

U.S. PATENT DOCUMENTS

| | | | |
|---|---|---|---|
| 4,785,166 | 11/1988 | Kushima | 235/441 |
| 4,792,667 | 12/1988 | Chen | 235/441 X |
| 4,999,601 | 3/1991 | Gervais | 235/492 |
| 5,122,646 | 6/1992 | Taeymans et al. | 235/492 |
| 5,198,777 | 3/1993 | Masuda et al. | 324/682 X |
| 5,270,526 | 12/1993 | Yoshihara | 235/487 |
| 5,434,397 | 7/1995 | Diehl et al. | 235/380 |

FOREIGN PATENT DOCUMENTS

| | | |
|---|---|---|
| 0323347 | 7/1989 | European Pat. Off. . |
| 0447686 | 9/1991 | European Pat. Off. . |
| 0454570 | 10/1991 | European Pat. Off. . |
| 0468848 | 1/1992 | European Pat. Off. . |
| 2554262 | 5/1987 | France . |
| 2646260 | 10/1990 | France . |
| 2646261 | 10/1990 | France . |
| 2659770 | 9/1991 | France . |
| 2919158 | 11/1980 | Germany . |

Primary Examiner—Kenneth A. Wieder
Assistant Examiner—Glenn W. Brown
Attorney, Agent, or Firm—Meltzer, Lippe, Goldstein et al.

[57] ABSTRACT

A device for detecting attempts at fraud by connection of an electric feed line (13) to an apparatus for reading and writing on a chip card (3) essentially comprises a resonance unit (6) coupled to a contacting element (2) of the apparatus, and a measuring device (7). In the resonance unit (6) a generator (4) which is coupled to a resonator (1) by way of an impedance converter (5) generates a standing wave. The feed line (13) disturbs the properties of the resonator (1), that being detected by the measuring device (7) and evaluated.

13 Claims, 4 Drawing Sheets

DEVICE FOR DETECTING ATTEMPTS AT FRAUD ON AN APPARATUS FOR READING AND WRITING ON A CHIP CARD

This is a divisional of application Ser. No. 08/009,874, filed on Jan. 27, 1993, now U.S. Pat. No. 5,412,318, which is a continuation-in-part of application Ser. No. 07/967,620, filed Oct. 28, 1992, now abandoned.

BACKGROUND OF THE INVENTION

The invention relates to a device and a method for detecting attempts at fraud on an apparatus for reading and writing on a chip card for example a smart card.

Such devices are advantageously used in service systems—for example in automatic-payment phone units (payphones)—which operate with electronic chip cards.

In an attempted fraud situation, use is made of an altered chip card or a card which is externally similar thereto, with connecting points arranged in the same way, at least one of the connecting points being connected to an electrical feed line of a unit which is present outside the writing and reading apparatus and which is used to carry out the attempted fraud. The attempt at fraud can be detected by checking whether there is an inadmissible feed line of that kind.

A device is known (EP 0 468 848 A1) in which a signal in a feed line, if such is present, of a card receiver, can be detected by means of an inductive sensor and selected filter which is connected on the output side thereof, use being made of the fact that in the reading and writing operations a chip card is processed by signals at a known standardized frequency.

It is also known to a transmitter in the card receiver at one end of the chip card and a receiver at the other end thereof, and to use a feed line, if such is present, as a transmission medium, coupling occurring galvanically at the transmission end while at the receiving end coupling is effected inductively (EP 0323 347 A1, FR 2 554 262, FR 2 646 260) or capacitively (FR 2 646 260), or coupling occurring at the transmission end inductively and at the receiving end inductively (EP 0 447 686) or galvanically (EP 0 454 570).

Also known is a device having an oscillator (FR 2 646 261) which has a frequency-determining element which is moved over the chip card so that the feed line, if present, causes a disturbance at the output of the oscillator.

In the known devices, mechanical devices such as for example antennae or movable sensors are to be arranged in the card receiver in the region of the chip card in such a way that they are substantially protected from damage.

The invention is based on the problem of providing a reliable and well-protected device for certainly detecting attempts at fraud on an apparatus for reading and writing on a chip card.

SUMMARY OF THE INVENTION

In accordance with one aspect of the present invention, there is provided an attempted fraud detection device which has a resonance unit with a resonator which is coupled to the connecting point and whose electrical properties can be varied by the feed line and detected by the measuring device.

BRIEF DESCRIPTION OF THE DRAWINGS

Embodiments of the invention are described in greater detail hereinafter with reference to the drawings in which.

DETAILED DESCRIPTION OF THE INVENTION

Figure 1:
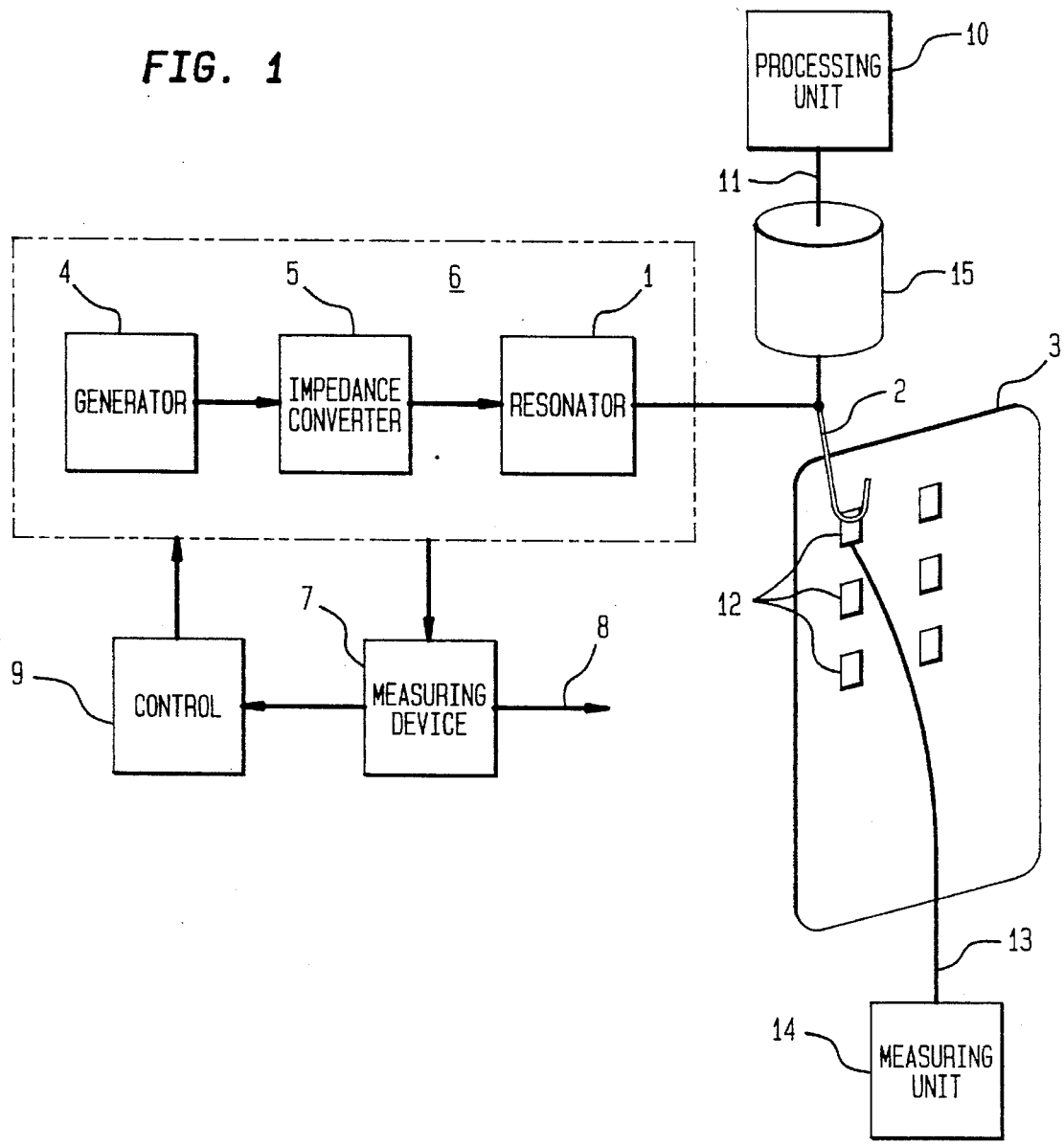
FIG. 1 shows the principle of a device for detecting attempts at fraud on an apparatus for reading and writing on a chip card.

In FIG. 1 reference numeral 1 denotes a resonator which is galvanically coupled to a contacting element 2 of a known apparatus (chip card reader/writer) for reading and writing in the memory on an also known chip card 3 and which together with a generator 4 and an impedance converter 5 forms a resonance unit 6, the output of the generator 4 being connected to the resonator 1 by way of the impedance converter 5. A measuring device 7 with an alarm output 8 for an alarm signal has at least one input connected to the resonance unit 6, and an output which is fed back to the resonance unit 6 by way of a control member 9.

Besides the contacting element 2, the apparatus for reading and writing on the memory of the chip card 3 has further similar contacting elements which however are not shown, a processing unit 10, and a card receiver (not shown in the drawing) with an entry opening for the chip card 3. Each of the contacting elements is connected to the processing unit 10 by way of an electric line 11.

The chip card 3 is a value card which has at least one electronic component, for example a microcomputer or a memory, which can be accessed by way of a number of connecting points 12 for the writing and reading apparatus, which has a contacting element 2 for each of the connecting points 12. The number of the connecting points 12 and the arrangement thereof on the chip card 3 is standardized, in which respect there are different standards.

As is known, in an attempt, at fraud, an altered chip card 3 or a card which is externally similar thereto, with the connecting points 12 arranged in the same way, is preferably used, at least one of the connecting points 12 being connected to an electric feed line 13 of a unit 14 which is disposed outside the apparatus. When the chip card is presented to the apparatus, any feed line 13, if present, is connected to the corresponding contacting element 2. The unit 14 which serves for the attempted fraud is for example a measuring unit or a simulator.

A device for detecting the attempt at fraud by connection of the feed line 13 to the contacting element 2 comprises the resonance unit 6, the measuring device 7, the control member 9 and a screening means 15 which is disposed between the resonance unit 6 and the lines 11; details of the device and the mode of operation thereof are described hereinafter.

The generator 4 whose output impedance is tuned by the impedance converter 5 to the resonator 1 generates in the resonator 1 an electromagnetic oscillation at a frequency of for example one GHz.

Preferably the resonance unit 6 is so tuned that a standing wave is produced in the resonator 1 at least when the feed line 13 to the connecting point 12 connected to the resonator 1 by way of the connecting element 2 is missing. The feed line 13 causes the properties of the resonator to be disturbed so that its input impedance and the oscillation are measurably altered.

Figure 2:
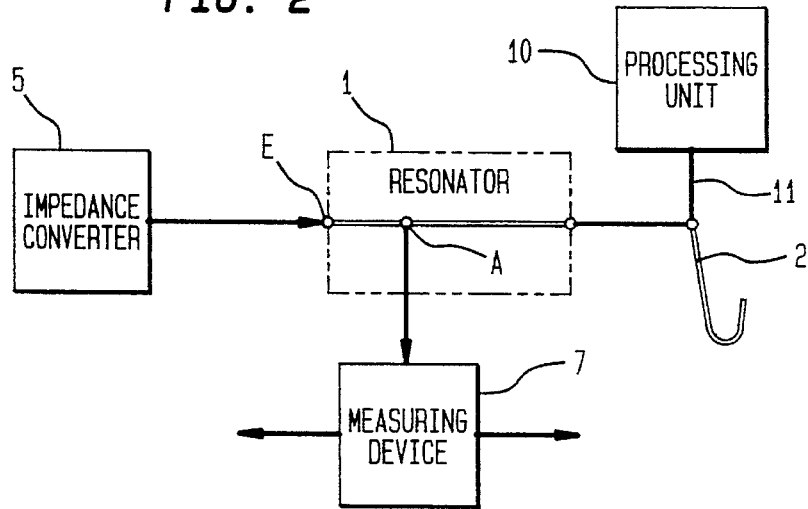
FIG. 2 shows an alternative configuration of the device with a conductor as a resonator.

Advantageously, the resonator, as shown in FIG. 2, is an electrical conductor or a waveguide which is in the form of a wire, a stranded wire lead, a conductor track or a hollow body and which has at least one tapping A galvanically connected to the input of the measuring device 7. The tapping A is preferably disposed in the vicinity of a node of the standing wave.

In a first alternative configuration of the device, the measuring device 7 measures the electrical voltage at the tapping A and compares the measurement value to a predetermined reference value in respect of the voltage which occurs at the tapping A when the feed line 13 is not connected to the contacting element 2. An attempt at fraud is recognized by virtue of the magnitude of the difference between the measurement value and the reference value, and the alarm signal is generated for example at the output of a threshold switch which belongs to the measuring device 7.

Advantageously, the measuring device 7 has processing means such as for example amplifiers or filters so that the measurement value can be reliably detected.

The alarm signal is advantageously evaluated in known manner by the processing unit 10.

The control member 9 permits a feedback of the measurement value to the generator 4 and/or the impedance converter 5 so that if necessary the frequency of the generator 4 and the impedance at the output side of the impedance converter 5 can be varied from the measuring device 7.

The screening means 15 on the one hand protects the processing unit 10 from disturbances which are caused by the resonance unit 6 while on the other hand it protects the device from troublesome influences of the lines 11.

In a second alternative configuration, advantageously, the voltage or the impedance at the input of the resonator 1 is measured and compared to a predetermined reference value in respect of the impedance or voltage. The reference value is the impedance of the resonator 1 or the voltage at the resonator 1 without the feed line 13 at the contacting element 2.

The first and second alternative configurations can be successfully combined.

In a third alternative configuration of the device, the frequency of the oscillation in the resonator 1 is altered by a variation at the generator 4 until the voltage at the tapping A reaches a given target value. The target value is equal to that value of the voltage which, with a predetermined reference value in respect of the frequency of the oscillation, occurs at the tapping A, if the feed line 13 is not connected to the contacting element 2. The measuring device 7 ascertains a measurement value of the frequency of the oscillation, for example by way of a further input connected to the output of the generator, and compares the measurement value to the frequency reference value. An attempted fraud is recognized on the basis of the magnitude of the difference between the measurement value and the reference value.

The third and second alternative configurations can be successfully combined.

Figure 3:
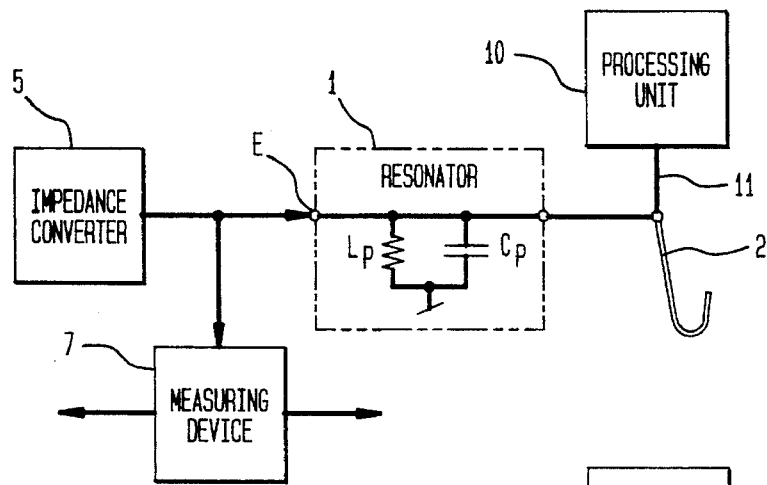
FIG. 3 shows an alternative configuration of the device with a parallel resonant circuit as a resonator.
Figure 4:
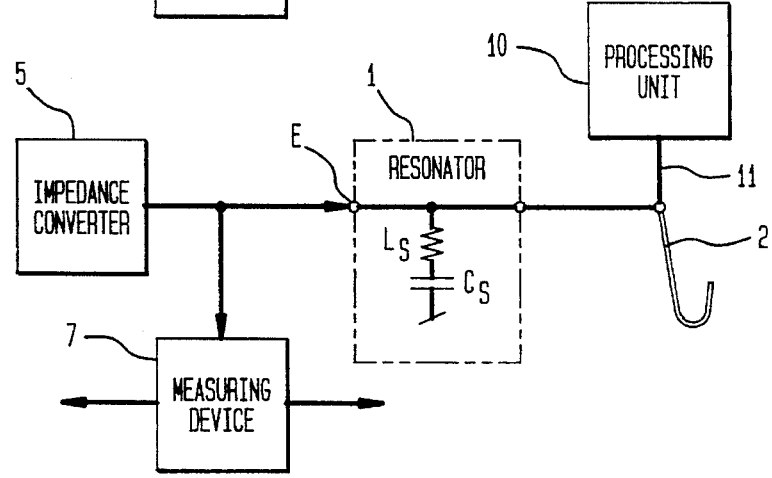
FIG. 4 shows an alternative configuration of the device with a series resonant circuit as a resonator.

In a fourth alternative configuration of the device, the resonator 1 is either a parallel resonant circuit comprising a coil $L_p$ and a capacitor $C_p$, as shown in FIG. 3, or a series resonant circuit comprising a coil $L_S$ and a capacitor $C_S$, as shown in FIG. 4, the quality of which is altered by the feed line 13. Advantageously, in this alternative configuration the voltage or the impedance at the input E of the resonator 1 is measured and compared to a predetermined reference value in respect of the impedance or voltage, which the resonator 1 has without the feed line 13 at the contacting element 2.

By virtue of the fact that the electrical properties of the resonance unit 6 which is galvanically connected to the contacting element 2 and which operates in the Gigahertz range are measurably influenced by a feed line 13 in the present device, a feed line 13 can be certainly detected, irrespective of its diameter, its position or its screening.

The device can be arranged entirely outside the card receiver as it is only coupled to the contacting element 2. No precautions are required in the space between the electronic component (microcomputer or memory) of the chip card 3 and the entrance opening of the card receiver.

The resonator 1 is preferably coupled to that contacting element 2 which contacts the potential reference point (signal ground) of the chip card 3.

Figure 5A:
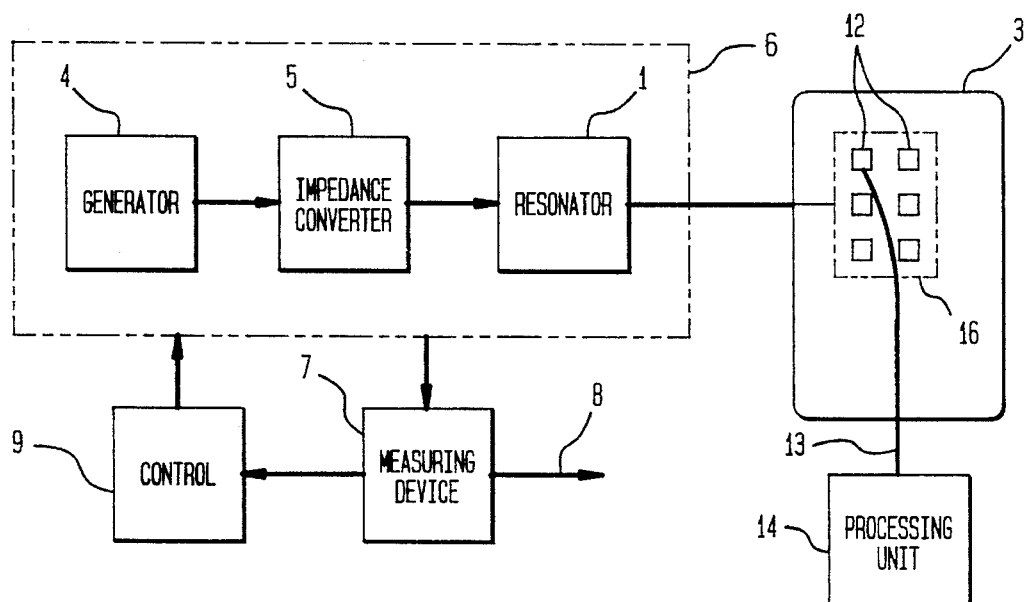
FIG. 5a shows a plan view of an alternative configuration of the device.
Figure 5B:
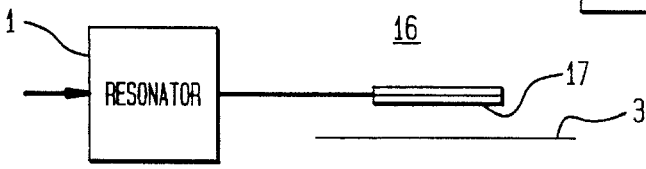
FIG. 5b shows a side view of parts of the device shown in FIG. 5a, FIG. 6 shows an alternative configuration of the device with a conductor as a resonator, with at least two tappings.

In FIG. 5, instead of the galvanic connection to the contacting element 2 (FIG. 1), the resonator 1 has a coupling member 16 for a non-galvanic coupling of the resonator 1 to the connecting points 12 and thus to the feed line 13. Coupling occurs capacitively or inductively depending on the respective nature of the coupling member 16.

For capacitive coupling of the resonator 1, the coupling member 16 is so designed that a voltage at the output of the resonator 1 is influenced by way of an electrical field by the feed line 13.

The coupling member 16 for capacitive coupling advantageously has a layer 17 of a metal, which is parallel to the two largest flat faces of the chip card 3 and which is arranged opposite a zone enclosing the connecting points 12 of the chip card 3, and which approximately covers the surface of the zone.

For inductive coupling of the resonator 1, the coupling member 16 is so arranged that a current in the resonator 1 is influenced by way of a magnetic field by the feed line 13.

The electric feed line 13 which is coupled to the resonator 1 by way of the coupling member 16, at one of the connecting points 12, alters the properties of the resonator 1, which are detected by the measuring device 7.

With the further configuration of the device, it is possible to detect the attempted fraud without the connecting points 12 of the chip card 3 being galvanically connected to the contacting elements 2. The attempted fraud can therefor advantageously be detected prior to the application of the contacting elements 2 to the connecting points 3 or even upon insertion of the chip card 3 into the apparatus for reading and writing on the chip card, the properties of the resonator 1 being advantageously substantially independent of the contact elements 2 and the lines 11.

In addition the properties of the resonator 1 are substantially independent of the installed electronic component on the chip card 3; the device can therefore be advantageously used in an unchanged form for different configurations of the chip card 3.

Figure 6:
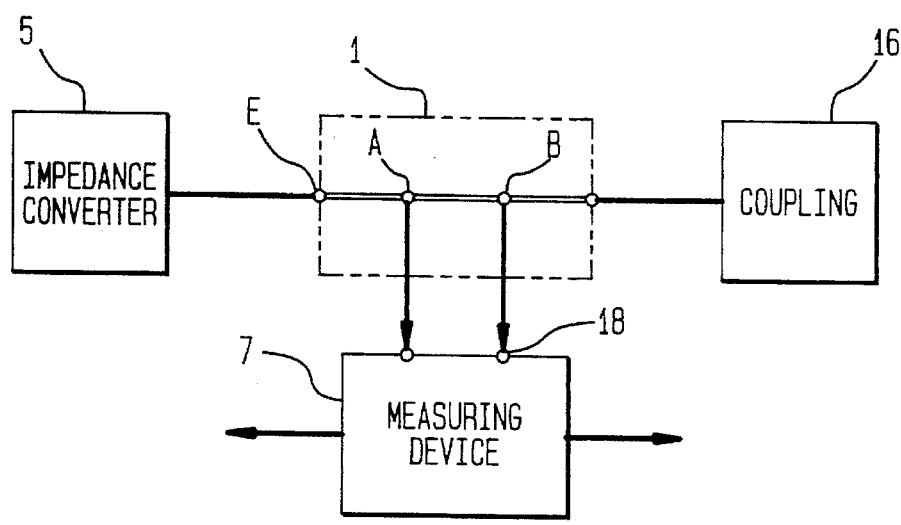

FIG. 6 shows part of a fifth alternative configuration of the device in which the resonator 1 is an electric conductor or a wave guide, whereby the resonator 1 is equipped with the tapping A connected to the input of the measuring device and with the coupling member 16. The resonator 1 has a second tapping B which is connected to another input 18 of the measuring device 7. The second tapping B is preferably located in proximity of a node of the standing wave. The electric voltage at tapping A can also be measured at tapping B by means of the measuring device, as described earlier.

Figure 7:
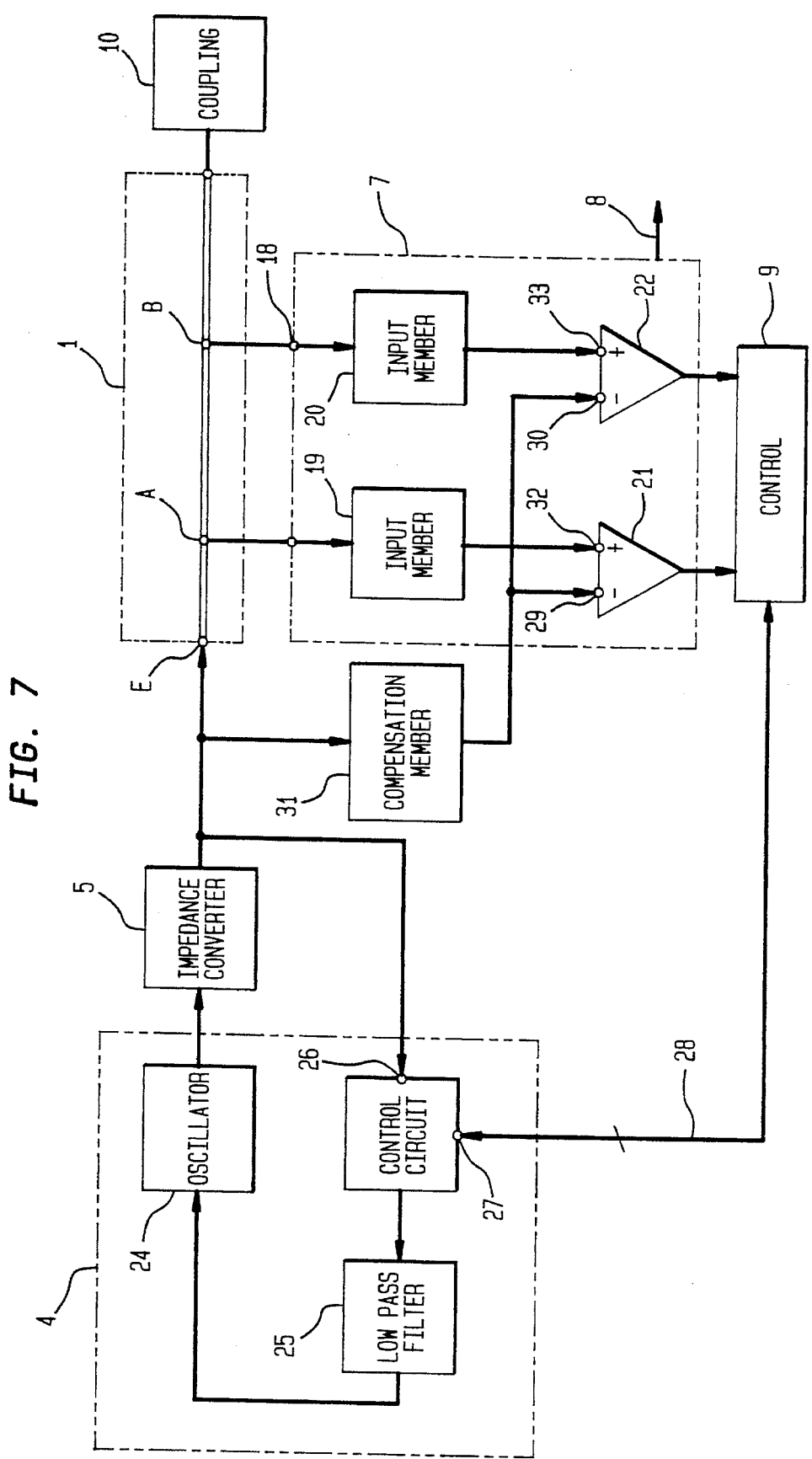
FIG. 7 shows a comprehensive diagram of an alternative configuration of the device with a resonator according to FIG. 6.

FIG. 7 shows the resonator 1 connected to the coupling member 16 with input E and with the two tappings A and B, with generator 4, impedance converter 5, measuring device 7 and control member 9. The measuring device 7 is advantageously equipped with a first input member 19 connected to the tapping A on the input side, with a second input member 20 connected to the tapping B on the input side, with a first threshold switch 21 and with a second threshold switch 22, whereby the two threshold switches 21 and 22 are connected to the control member 9 on the output side.

The generator 4 is preferably equipped with a phase control circuit (PLL) 23, with a voltage-controlled oscillator (VCO) 2 connected on the output side to the impedance converter 5 and with a low-pass filter 25 in circuit between the phase control circuit 23 and the oscillator 24, whereby a frequency input 26 of the phase control circuit 23 is connected to the input E of resonator 1 following the output of the impedance converter 5 and whereby a multi-pole control input 27 of the phase control circuit 23 is connected via bus 28 to the control member 9.

The phase control circuit 23 can be substantially in the form of a building block of type MC145191.

A reference input 29 of the first threshold switch 21 is connected to a reference input 30 of the second threshold switch 22 and is connected via a compensation member 31 at the input E of the resonator 1. The voltage changes at input E of resonator 1 caused by fluctuations in the environmental temperature can be compensated for in such manner by the compensation member 31 that a reference signal at the output of the compensation member 31 or at the two reference inputs 20 and 30 is to a great extent independent of temperature.

The first threshold switch 21 is provided with a signal input 32 which is connected to the output of the first input member 19. A signal input 33 of the second threshold switch 22 is connected to the output of the second input member 20.

The resonator 1, made in the form of an electric conductor or of a wave guide is equipped with several conductor elements coupled by coupling members if necessary, whereby at least one of the conductor elements is installed so as to be capable of displacement if this should be necessary, for instance if this is required by the construction or the functioning of the device used to read and write in the memory of the chip card 3.

Figure 8:
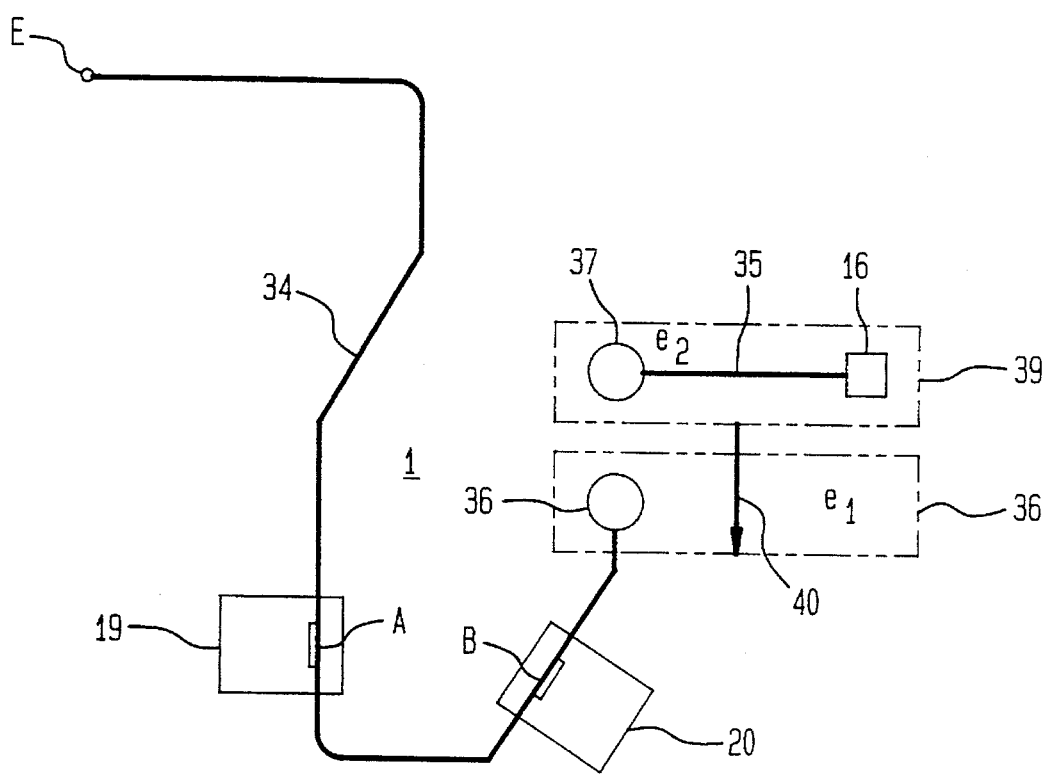
FIG. 8 shows an embodiment of a resonator according to FIG. 6.

Reference number 34 in FIG. 8 designates a first conductor element and 35 a second conductor elements of the resonator 1 made in the form of a wave guide at one end of which input E is provided and the other end of which is connected to the coupling member 16. The form of the first conductor element 34 can be adapted to the construction and the available space in the device to read and write in the memory of the chip card. The first conductor element 34 is equipped with the two tappings A and B and with a first coupling member 36. One end of the second conductor element 35 ends with the coupling element 16 and the other with a second coupling member 37.

The first conductor element 34 is preferably a flexible cable and a printed circuit contains the coupling member 16 and the second conductor element 35 with coupling member 37.

The first coupling member 36 is located in a plane $e_1$ of which one part is delimited by an imaginary border 38 which also encloses the first coupling member 36.

The second coupling member is located in a second plane $e_2$ which is preferably parallel with the first plane $e_1$ and one part of which is delimited by another imaginary border 39 which also contains the second coupling member 37. The two imaginary borders 38 and 39 enclose congruent surfaces.

The second conductor element 35 can be displaced in the direction of an arrow 40 at least so far that the two conductor elements 34 and 35 can be coupled optimally by the two coupling members 36 and 37 in the resonator 1. An advantageous coupling of the two conductor elements 34 and 35 is achieved if the two borders 38 and 39 in FIG. 8 coincide.

The device to detect attempted fraud can be connected to the chip card 3 through a movement of the second conductor element 35 in direction of arrow 40 while a movement in the direction opposite to arrow 40 disconnects it from the chip card.

If necessary the movements in direction of arrow 40 are initiated by inserting the card 3 into the chip card 3 memory read/write device.

In an advantageous embodiment of the resonator 1 the two input members 19 and 20 are located directly on the corresponding tapping A or B and can be made in form of SMD's (surface mounted devices), for example.

If necessary the tappings A or B are provided on resonator 1 directly next to each other or are physically made in the form of one tapping to which the measuring device 7 can be connected.

An advantageous embodiment of the coupling elements 36 and 37 can be achieved by one single winding on the first conductor segment 34 or on the second conductor segment 35 for each.

At least two different values of the frequency of the generator 4 can be set by the control member 9, whereby a first value may be equal to 500 MHz and a second value 455 MHz for instance.

The length of the second conductor segment 35 is advantageously adapted to one quarter of the wavelength in resonator 1 at the first value of the frequency while the length of the first conductor segment 34 is advantageously a multiple of this half wavelength.

The description of a process in which attempted fraud can be detected by means of the device according to FIG. 7 follows.

In a first step the frequency of the generator 4 is set to a first value. The voltage at tapping A is detected by the first input number 19 and is compared in the first threshold switch 21 with the reference signal appearing at the reference input 29. If the detected voltage is not within an expected first range the attempted fraud is recognized, the process is stopped and the chip card 1 is refused.

If the voltage detected at tapping A is within the expected range the frequency of the generator 4 is set to the second value in a second step. The voltage at the second tapping B is detected by the second input member 20 and is compared in the second threshold switch 22 with the reference signal appearing at the reference input 30. If the detected voltage is not within an expected second range the attempted fraud is detected and the chip card 1 is refused.

The chip card 1 is accepted only if the voltage detected at tapping A lies within a first range during an oscillation with a first value of the frequency and if the voltage detected at the second tapping B lies within a second range during an oscillation with a second value of the frequency.

Due to the fact that one voltage is detected at the resonator 1 and compared with a desired value for each of at least two different values of the frequency the attempted fraud can also be detected if the effective length of feeder 13 is a multiple of half the wavelength of the oscillation at one of at least two values of the frequency.

The device according to FIG. 7 has a first node without feeder 13 (FIG. 1) at the first value of the frequency at tapping A and a second node at the second value of the frequency at tapping B.

An advantageous method to determine the optimal first value of the frequency of the oscillation in resonator 1 comprises changing the frequency in a certain direction by means of the control member 9 and then detecting a first threshold frequency $f_1$ when an output signal at the first threshold switch 21 changes from a first extreme value (e.g., a maximum) into a second extreme value occurring within the frequency range of the fist node (e.g., a minimum). The frequency is altered continuously in the same direction and a second threshold frequency $f_2$ is detected when the output signal changes back from the second extreme value to the first extreme value.

The optimal first value of the frequency is a mean value of the two threshold frequencies $f_1$ and $f_2$; the first value is advantageously the geometric center $(f_1 * f_2)^{1/2}$ of the two threshold frequencies $f_1$ and $f_2$.

The optimal second value of the frequency is found by applying the above-described method to a second node whereby an output signal at the second threshold switch 22 is used.

It is advantageously possible to carry out a method to determine the two optimal values of the frequency of the oscillation in resonator 1 automatically. As required, each embodiment of the device is individually according to the method.

I claim:

1. A detector-device for detecting attempts at fraud by varying the electrical properties of a connecting point (12) of a chip card (3) in an apparatus for reading and writing in a memory on said chip card (3) via an electric feed line (13) connected to said connecting point (12), said detector-device comprising:

a resonance unit (6) and a measuring unit (7) connected to said resonance unit (6) wherein said resonance unit (6) has a resonator (1) that is coupled to said connecting point (12), said resonance unit (6) having electrical properties that are varied by said feed line (13) and detected by said measuring device (7).

2. A detector-device according to claim 1 wherein the resonator (1) is galvanically connected to a contacting element (2), which serves for contacting of the connecting point (12), of the apparatus for reading and writing on the chip card (3).

3. A detector-device according to claim 1 wherein the resonator (1) is capacitively or inductively coupled to the connecting point (12) by means of a coupling member (16).

4. A detector-device according to claim 1 wherein the resonance unit (6) is constructed and arranged so that a standing wave is generated in the resonator (1) at least when there is no electric feed line (13).

5. A detector-device according to claim 1 wherein the resonator (1) is an electrical conductor.

6. A detector-device according to claim 5, wherein the electrical conductor has a first conductor segment (34) with a first coupling element (36) and a second conductor segment (35) with a second coupling element (37), wherein the two conductor segments (34; 35) are coupled capacitively by the two coupling elements (36, 37).

7. A detector-device according to claim 5, wherein the electric conductor has a first tapping (A) which is connected to the measuring device (7) by means of which the voltage at the first tapping (A) is measured.

8. A detector-device according to claim 7, wherein the electric conductor has a second tapping (B) which is connected to the measuring device (7) by means of which the voltage at the second tapping (B) is measured.

9. A detector-device according to claim 5, wherein the electrical conductor has a first conductor segment (34) with a first coupling element (36) and a second conductor segment (35) with a second coupling element (37), wherein the first two conductor elements (34,35) are coupled inductively by the two coupling elements (36, 37).

10. A detector device according to claim 1 wherein the resonator (1) is a resonant circuit which has a capacitor ($C_S$) and a coil ($L_S$) which is connected in series with the capacitor ($C_S$).

11. A detector-device according to claim 1 wherein the resonator (1) is a resonant circuit which has a capacitor ($C_p$) and a coil ($L_p$) which is connected in parallel with the capacitor ($C_p$).

12. A detector device according to claim 1, wherein the resonator is connected via an impedance converter (5) to a generator (4) equipped with a voltage-controlled oscillator (24) and with a phase control circuit (23).

13. A detector device according to claim 1, wherein an oscillation is generated in the resonator (1), the frequency of which is controllable, whereby the frequency is selected from a first value and at least one second value.

* * * * *